Dec. 19, 1967  MAKOTO WASAI ET AL  3,359,477
ACCELERATION AND DECELERATION CONTROL SYSTEM FOR DC MOTOR
Filed May 11, 1965  3 Sheets-Sheet 1

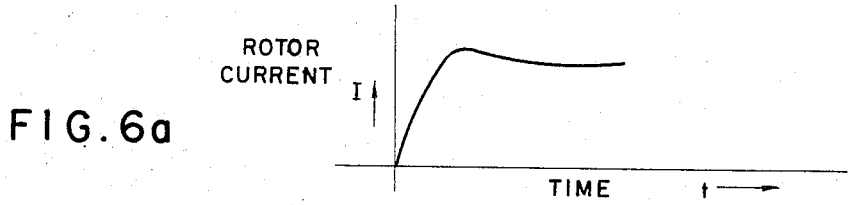
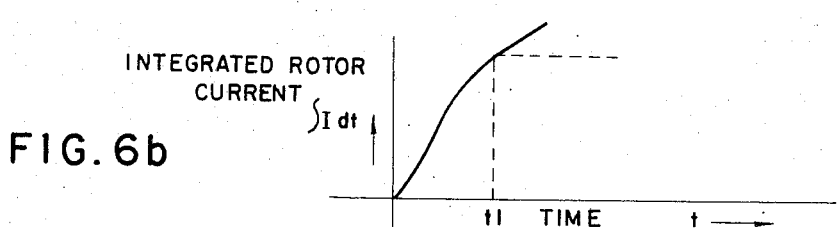
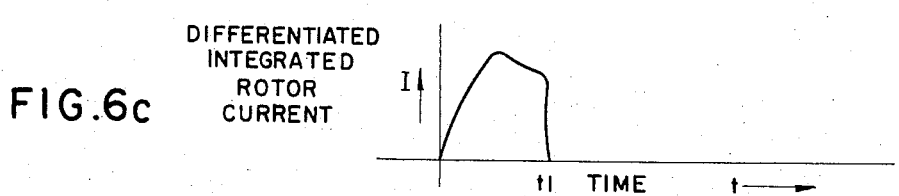
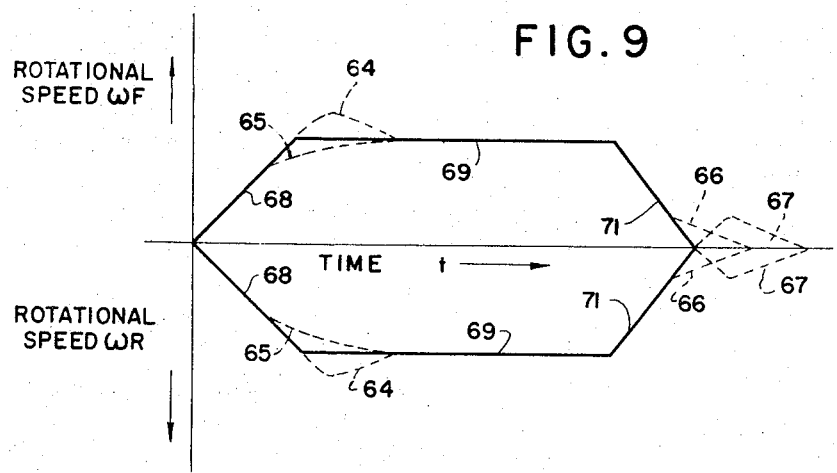

United States Patent Office 3,359,477
Patented Dec. 19, 1967

3,359,477
ACCELERATION AND DECELERATION CONTROL SYSTEM FOR DC MOTOR
Makoto Wasai, Yokohama-shi, and Yasuo Azuma, Kawasaki-shi, Japan, assignors to Fujitsu Limited, Kawasaki, Japan, a corporation of Japan
Filed May 11, 1965, Ser. No. 454,922
Claims priority, application Japan, May 13, 1964, 39/26,866
6 Claims. (Cl. 318—262)

ABSTRACT OF THE DISCLOSURE

An acceleration and deceleration control system for a DC motor comprises a rotor current supply which supplies acceleration current, operating current and deceleration current to the rotor. An integrating circuit coupled to the rotor current supply integrates the acceleration current during acceleration of the rotor and the deceleration current during deceleration of the rotor. A clamping circuit connected between the integrating circuit and the rotor current supply clamps the integrated acceleration current when such current reaches an operating magnitude corresponding to the operating speed of the rotor and clamps the integrated deceleration current when such current reaches a rest magnitude corresponding to zero operating speed. A differentiating circuit connected to the integrating circuit differentiates the integrated acceleration and deceleration currents. A control unit connected between the differentiating circuit and the rotor current supply stops the supply of acceleration current and initiates the supply of operating current to the rotor at the time that the integrated acceleration current reaches the operating magnitude and stops the supply of deceleration current and stops the supply of current to the rotor at the time that the integrated deceleration current reaches the rest magnitude.

---

The present invention relates to an acceleration and deceleration control system for a DC motor. More particularly, the invention relates to an acceleration and deceleration control system for a DC motor of shunt or separately excited type.

In certain uses, a DC motor must rapidly accelerate from standstill or rest to operating speed and must rapidly decelerate from operating speed to standstill or rest. Thus, for example, a DC motor which drives a tape recorder must rapidly accelerate and decelerate in order to rotate the feed roller for the magnetic tape at the proper operating speed. During acceleration, the current flow in the motor is greater than that during operating speed. During deceleration, an inverse current of considerable magnitude flows in the motor.

For such uses, it is desirable that the motor reach its operating speed with a minimum overshoot and that it come to rest, after operation, without overrun or reversal. In a known speed control system of the prior art for a DC motor, as shown in FIG. 1, a tachometer 11 is coupled to the rotor of a DC motor 12 having an output shaft 13. The tachometer 11 measures the speed of rotation of the motor 12. In another known speed control system of the prior art for a DC motor, as shown in FIG. 2, a magnetic drum 14 is coupled to the rotor of a DC motor 15 via motor shaft 16. A reproducing head 17 positioned in operative proximity with the magnetic drum 14 provides signals which indicate the speed of rotation of the motor 15.

In the speed control systems of FIGS. 1 and 2, when the predetermined operating speed is reached by the motor, as indicated by the tachometer 11 in one case and by the reproducing head 17 in the other case, the acceleration current is cut off or reduced to and replaced by the operating current. In coming to rest from its operating speed, when the motor comes to rest, as indicated by the tachometer or reproducing head, the deceleration current is cut off or reduced to zero. The speed control systems of FIGS. 1 and 2 have the disadvantage of requiring equipment external to the motor, such as the tachometer and the magnetic drum and reproducing head. A further disadvantage is the difficulty of determining the exact instant at which the motor comes to rest. This is difficult because the tachometer or magnetic drum indicate zero speed by producing no signal. The output of the tachometer or magnetic drum may be indicated as it approaches zero, and the actual occurrence of the first zero output may be presumed on the basis of the rate of change of the output, but such a determination is not only difficult but may be quite erroneous.

FIG. 3 illustrates the voltages in a prior art speed control system for a DC motor and FIG. 4 illustrates the motor speeds at the voltages of FIG. 3. In FIG. 3, the abscissa represents the time $t$ in seconds and the ordinate represents the motor voltage in volts and in FIG. 4, the abscissa represents the time $t$ in seconds and the ordinate represents the rotor speed $\omega$ in r.p.m. or the speed of rotation. As shown in FIG. 3, the acceleration voltage V1 is applied for a time period $t1$ and the deceleration voltage V2 is applied for a time period $t2$. The operating voltage V3 is applied during the operation of the motor, from the termination of the acceleration to the initiation of the deceleration. The acceleration and deceleration voltages V1 and V2 are kept constant for determined period of time $t1$ and $t2$ or the periods of time $t1$ and $t2$ are determined by the extent of the acceleration and deceleration voltages. The speed of rotation of the rotor tends to follow the broken lines of FIG. 4, but tends to follow the solid lines, due to control by the speed control system.

In the prior art system, the operation of which is illustrated in FIGS. 3 and 4, a variation in current due to an increase in temperature of the rotor winding or due to a variation in position of the brushes and/or segments of the motor, causes variations or errors in acceleration and deceleration and these errors are not compensated.

The principal object of the present invention is to provide a new and improved acceleration and deceleration control system for a DC motor.

An object of the present invention is to provide an acceleration and deceleration control system for a DC motor which avoids the disadvantages and difficulties of speed control systems of the prior art.

In accordance with the present invention, an acceleration and deceleration control system for a DC motor having a rotor which is accelerated from rest to operating speed and which is decelerated from operating speed to rest during normal operation, the rotor having a rotor winding through which acceleration current flows during acceleration of the rotor and through which deceleration current flows during deceleration of the rotor, operating current flowing therethrough during operating speed thereof, comprises a rotor current supply for supplying acceleration current, operating current and deceleration current to the rotor. An integrating circuit coupled to the rotor current supply integrates the acceleration current during acceleration of the rotor and integrates the deceleration current during deceleration of the rotor. A clamping circuit connected between the integrating circuit and the rotor current supply clamps the integrated acceleration current when it reaches an operating magnitude corresponding to the operating speed of the rotor and clamps the integrated deceleration current when it reaches a rest magnitude corresponding to zero operating speed. A control unit connected between the integrating circuit and the rotor current supply stops the supply of acceleration current and initiates the supply of operating current to the rotor at the time that the integrated acceleration current reaches the operating magnitude and stops the supply of deceleration current and of current to the rotor at the time that the integrated deceleration current reaches the rest magnitude.

In accordance with the method of the present invention, a method for controlling the acceleration and deceleration of a DC motor having a rotor which is accelerated from rest to operating speed and which is decelerated from operating speed to rest during normal operation, comprises selectively supplying acceleration current, operating current and deceleration current to the rotor. The acceleration current is integrated during acceleration of the rotor and the deceleration current is integrated during deceleration of the rotor. The integrated acceleration current is clamped when it reaches an operating magnitude corresponding to the operating speed of the rotor and the integrated deceleration current is clamped when it reaches a rest magnitude corresponding to zero operating speed. The supply of acceleration current is stopped and the supply of operating current is initiated to the rotor at the time that the integrated acceleration current reaches the operating magnitude and the supply of deceleration current and current to the rotor is stopped at the time that the integrated deceleration current reaches the rest magnitude.

In order that the present invention may be readily carried into effect, it will now be described with reference to the accompanying drawings, wherein:

FIGS. 6a, 6b and 6c are graphical presentations of waveforms which aid in explaining the operation of the system of FIG. 5;

FIG. 9 is a graphical presentation of the operation of the tape recorder system of FIG. 8.

Figure 1:
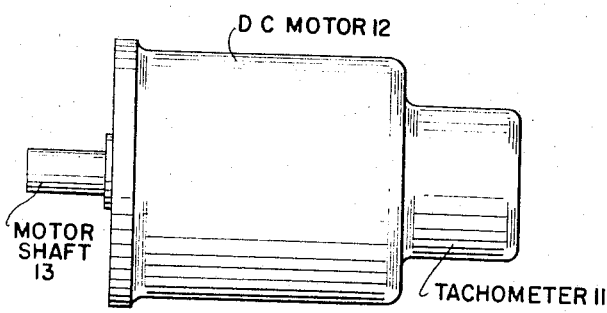
FIG. 1 is a view of an embodiment of a tachometer speed control system of the prior art for a DC motor.
Figure 2:
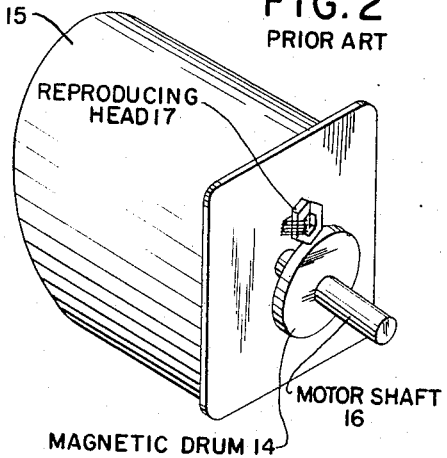
FIG. 2 is a perspective view of an embodiment of a magnetic signal speed control system of the prior art for a DC motor.
Figure 3:
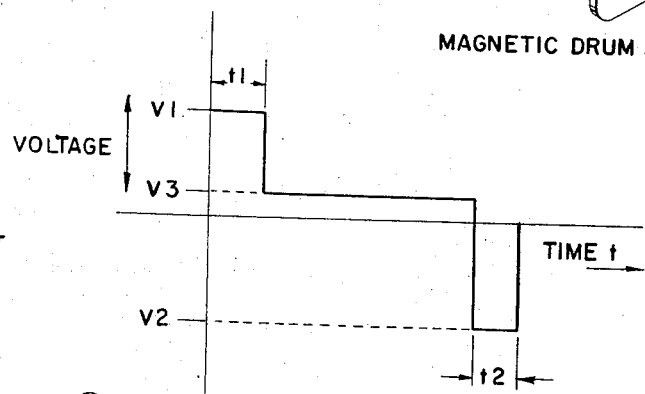
FIG. 3 is a graphical presentation of the voltages of a speed control system of the prior art for a DC motor.
Figure 4:
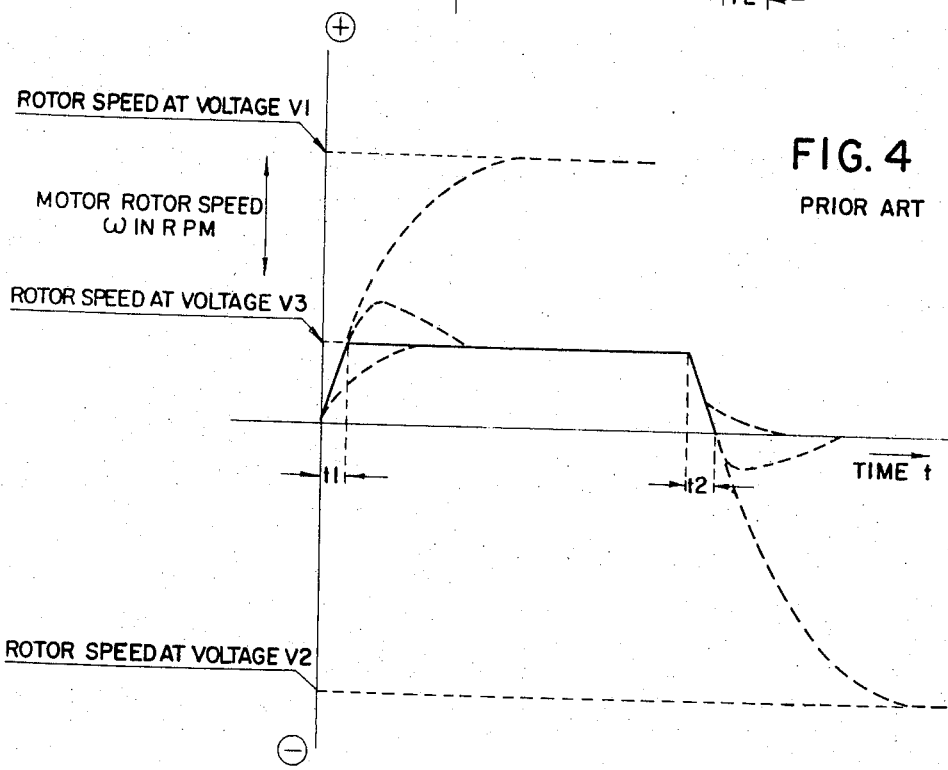
FIG. 4 is a graphical presentation of the motor speeds at the voltages of FIG. 3.
Figure 5:
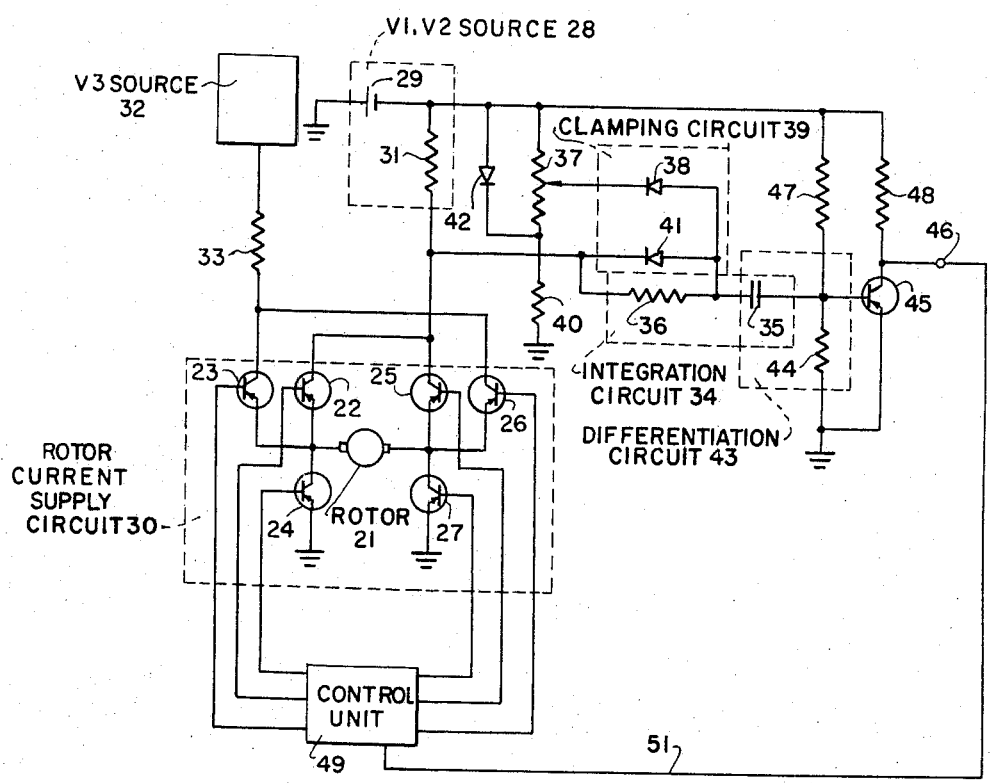
FIG. 5 is a circuit diagram of an embodiment of the acceleration and deceleration control system of the present invention.

FIG. 5 illustrates the circuit of an embodiment of the present invention. In a DC motor, especially of shunt or separately excited type, the rotational torque generated by the motor is proportional to the current flowing in its rotor. In accordance with the present invention, the current flowing in the rotor is integrated during acceleration and during deceleration and the integrated values are varied to and clamped at predetermined magnitudes. This permits operation of the motor at a predetermined operating speed and permits the motor to come to an abrupt rest without overshoot, overrun, reversal or deviation due to voltage variation caused by temperature variation or variation of the position of brushes or segments.

If a rotating body has a moment of inertia J and a rotation torque T is applied to it, the rotary motion of the body is indicated as $$T = J\frac{d\omega}{dt} + A\omega + B$$

where A is the coefficient of viscosity resistance and B is the frictional resistance. The coefficient of viscosity resistance and frictional resistance are very small compared with $$J\frac{d\omega}{dt}$$

when acceleration and deceleration are rapid, and may be ignored. The speed of rotation $\omega$ of the motor at a time $t$ may thus be expressed as $$\omega = \frac{1}{J}\int_0^t T\,dt$$

Generally, in a DC motor, when the magnetic flux of the field is constant, the torque produced by the motor is proportional to the current flowing in the rotor. Thus, if the proportionality constant is K, the speed of rotation $\omega$ of the motor becomes $$\omega = \frac{K}{J}\int_0^t I\,dt$$

In order to operate the motor at the predetermined operating speed, the foregoing equation must be equal to such speed. Accordingly, the current flowing in the rotor of the motor may be integrated and the time during which the acceleration voltage is applied may be controlled, so that the integrated current may be varied to and clamped at a predetermined constant operating magnitude which is equivalent to the determined speed of operation.

In accordance with the invention, acceleration current flowing in the rotor is determined and integrated, so that any variation of such current due to an increase in temperature of the rotor winding, a variation of applied voltage, or a variation of brush and segment positions, is compensated for, and the speed of operation of the motor is maintained at exactly its predetermined magnitude as soon as acceleration is completed. In the same manner, in accordance with the invention deceleration current flowing in the rotor may be determined and integrated and the integrated current may be varied to and clamped at a predetermined constant rest magnitude which is equivalent to the zero speed or the speed at rest, so that the speed of operation of the motor is decelerated abruptly to zero as soon as deceleration is completed without effect due to an increase in temperature of the rotor winding, a variation of applied voltage, or a variation of brush and segment positions.

In FIG. 5, the rotor 21 of the DC motor, the acceleration and deceleration of which is controlled, is connected at one terminal to the emitter electrode of a transistor 22, the emitter electrode of a transistor 23 and the collector electrode of a transistor 24 and is connected at its other terminal to the emitter electrode of a transistor 25, the emitter electrode of a transistor 26 and the collector electrode of a transistor 27. The emitter electrode of each of the transistors 24 and 27 is connected to a point at ground potential.

The collector electrodes of the transistors 22 and 25 are connected to each other and to a source 28 of acceleration and deceleration voltages V1 and V2. The voltage source 28 may comprise a source of DC voltage 29 and a resistor 31. The collector electrodes of the transistors 23 and 26 are connected to each other and to a source 32 of operating voltage V3 via a resistor 33. The transistors 22, 23, 24, 25, 26 and 27 comprise, with the voltage sources 28 and 32, a rotor current supply circuit 30.

The acceleration current or voltage at the initiation of operation and the deceleration current or voltage at the termination of operation are each integrated by an integration circuit 34 comprising a capacitor 35 and a resistor 36 connected in series with each other. When the integrated current or voltage attains the predetermined magnitude Q, determined by a variable register 37, the integrated current or voltage is clamped by a diode 38 of a clamping circuit 39. The diode 38 is connected between a common point in the connection between the capacitor 35 and the resistor 36 of the integration circuit 34 and the tap of the variable resistor 37.

The variable resistor 37 is connected in series with a resistor 40 between the DC source 29 of the voltage source 28 of acceleration and deceleration voltage and a point at ground potential, and functions as a potentiometer. The clamping circuit 39 also includes a diode 41 which is connected in shunt across the resistor 36 of the integration circuit 34 and between a common point in the connection between the capacitor 35 and the resistor 36 of the integration circuit 34 and a common point in the connection between the collector electrode of the transistor 25 and the resistor 31 of the voltage source 28 of acceleration and deceleration voltage. The anode of each of the diodes 38 and 41 is connected to the common point of the integration circuit. The cathode of the diode 38 is connected to the tap of the variable resistor 37 and the cathode of the diode 41 is connected to the common point between the transistor 25 and the voltage source 28.

A diode 42 is connected in shunt across the variable resistor 37 and between the DC source 29 of the voltage source 28 and a common point in the connection between the variable resistor 37 and the resistor 40. The integrated current or voltage, clamped at the magnitude of the operating current or voltage, is differentiated by a differentiation circuit 43 comprising the capacitor 35 and a resistor 44. The differentiated current or voltage energizes a transistor 45, is produced at an output terminal 46, and is utilized to determine the time of acceleration and the time of deceleration.

The resistor 44 of the differentiation circuit 43 is connected in series with a resistor 47, the series connection 44, 47 being connected between the DC source 29 of the voltage source 28 and a point at ground potential; the resistor 44 being also connected in series with the emitter-base path of the transistor 45. A resistor 48 is connected between the collector electrode of the transistor 45 and the DC source 29 of the voltage source 28. The output terminal 46 is connected to the collector electrode of the transistor 45. The base electrodes of the transistors 22, 23, 24, 25, 26 and 27 are supplied with switching control or biasing voltages by any suitable means such as, for example, a control unit 49.

When the motor is started in a forward, as opposed to reverse, direction, the transistors 27 and 22 are made conductive or switched to their ON condition by the control unit 49 and the acceleration current flowing in the rotor 21 of said motor (FIG. 6a) is integrated by the integration circuit 34. The integrated rotor current is clamped to the predetermined magnitude Q corresponding to the operating voltage V3 (FIG. 6b) as provided by the variable resistor 37. The integrated rotor current is then differentiated by the differentiation circuit 43 and the differentiated current is provided at the output terminal 46 (FIG. 6c). In each of FIGS. 6a, 6b and 6c the abscissa represents time *t*. In FIG. 6a, the ordinate represents rotor current, in FIG. 6b the ordinate represents integrated rotor current and in FIG. 6c the ordinate represents differentiated integrated rotor current.

The time *t*1 at which the integrated current reaches the predetermined constant magnitude Q corresponding to the operating voltage is the time at which the acceleration of the motor is stopped and the motor is operated at its operating speed, as determined by said operating voltage. At this instant, the control unit 49, which is connected to the output terminal 46 via a line 51, switches the transistor 22 to its non-conductive condition and switches the transistor 23 to its conductive condition. When the acceleration current is stopped, the charge of the capacitor 35 is rapidly transmitted by the diode 41.

When, after operation of the motor in its forward direction at its operating speed, it is desired to stop the motor or bring it to rest, the transistors 23 and 27 are switched to their non-conductive condition and the transistors 24 and 25 are switched to their conductive condition by the control unit 49 and the deceleration current flowing in the rotor 21 of said motor is integrated by the integration circuit 34. The integrated rotor current is clamped to the predetermined constant current level Q by the diode 38. The integrated rotor current is then differentiated by the differentiation circuit 43 and the differentiated current is provided at the output terminal.

The time at which the integrated current reaches the constant magniude of current Q is the time at which the deceleration of the motor is stopped and the motor comes to rest. At this instant, the control unit 49 switches the transistors 24 and 25 to their non-conductive condition and the motor comes to rest.

When the motor is started in a reverse, as opposed to forward, direction, the transistors 24 and 25 are switched to their conductive condition by the control unit 49 and the acceleration current flowing in the rotor 21 of said motor is integrated by the integration circuit 34. The integrated rotor current is clamped to the constant magnitude of current Q corresponding to the magnitude of the operating voltage V3 and the integrated rotor current is then differentiated by the differentiation circuit 43 and the differentiated current is provided at the output terminal 46.

The time at which the integrated current reaches the predetermined constant magnitude of the current corresponding to the operating voltage is the time at which the acceleration of the motor is stopped and the motor is operated at its operating speed, as determined by said operating voltage. At this instant, the control unit 49 switches the transistor 25 to its non-conductive condition and switches transistor 26 to its conductive condition.

When, after operation of the motor in its reverse direction at its operating speed, it is desired to bring the motor to rest, the transistors 24 and 26 are switched to their non-conductive condition and the transistors 22 and 27 are switched to their conductive condition by the control unit 49 and the deceleration current flowing in the rotor 21 of said motor is integrated by the integration circuit 34. The integrated rotor current is clamped to the constant current level Q and is then differentiated by the differentiation circuit 43 and the differentiated current is provided at the output terminal.

The time at which the integrated current reaches the constant magnitude of current is the time at which the deceleration of the motor is stopped and the motor comes to rest. At this instant, the control unit 49 switches the transistors 22 and 27 to their non-conductive condition and switches the transistors 24 and 25 to their conductive condition and the motor comes to rest.

Although the acceleration and deceleration control system of the present invention has been explained in operation for controlling the acceleration and deceleration times, it may be readily utilized to control the voltage applied to the motor or to control both the voltage applied to the motor and the acceleration and deceleration times. It is also within the scope of the invention to correct the integrated current at the time of acceleration and at the time of deceleration to compensate for the effect of the inductance of the rotor winding, the effect of mechanical friction, and other effects.

Figure 7:
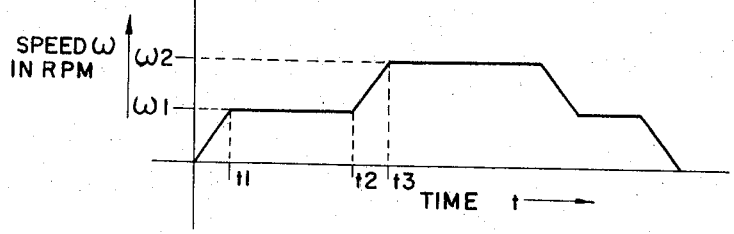
FIG. 7 is a graphical presentation of the operating speeds of a further application of the acceleration and deceleration control system of the present invention.

FIG. 7 illustrates the operating speeds of a further application of the acceleration and deceleration control system of the present invention. In FIG. 7, the abscissa represents time *t* and the ordinate represents rotational speed ω of the rotor. As hereinbefore explained, the rotational speed ω1 of the first step is indicated as $$\omega 1 = \frac{K}{J} \int_0^{t1} I dt$$

The rotational speed ω2 of the second step is indicated as $$\omega 2 = \omega 1 + \frac{K}{J} \int_{t2}^{t3} I dt$$

If the acceleration current is integrated and then varied to the magnitude of the current corresponding to the operating speed ω2, the time of application of the acceleration current or voltage is controlled in the aforedescribed manner. The time of application of the deceleration current or voltage is controlled in the aforedescribed manner. Thus, the acceleration time from start to the operating speed ω1 and from the operation speed ω1 to the operation speed ω2 is controlled, and the deceleration time from the operating speed ω2 to the operating speed ω1 and from the operating speed ω1 to rest are controlled in accordance with the present invention.

Figure 8:
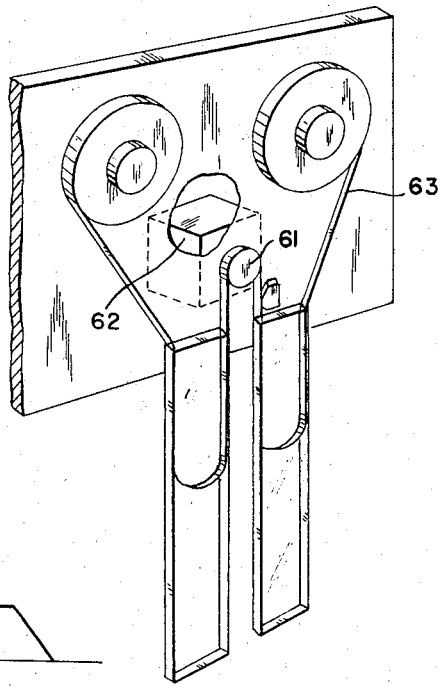
FIG. 8 is a view of a tape recorder system driven by a DC motor controlled by the acceleration and deceleration control system of the present invention.

FIG. 8 illustrates a tape recorded system driven by a DC motor controlled by the acceleration and deceleration control system of the present invention. In FIG. 8, a magnetic tape feed roller 61 is coupled to and driven by the DC motor 62. The magnetic tape feed roller 61 moves a magnetic tape 63. When the tape recorder system is started, the DC motor accelerates rapidly so that the rotational speed of the outer peripheral circumference of the feed roller 61 reaches the speed of operation, which is the operating speed for tape feed. As soon as the feed roller 61 reaches its operating speed, the accelerating current or voltage is stopped and the feed roller is operated at said operating speed. When it is desired to stop the tape recorder system, the motor is decelerated until a zero operating level is reached, at which time the motor is stopped abruptly.

The acceleration and deceleration control system of the present invention controls the operation of the motor to drive the tape recorder system of FIG. 8 in a proper manner, as indicated by FIG. 9. FIG. 9 graphically illustrates the driving of the tape recorder system of FIG. 8 in a forward direction and in a reverse direction. The abscissa represents time $t$, the ordinate in the positive direction represents the rotational speed ωF in the forward direction, and the ordinate in the negative direction represents the rotational speed ωR in the reverse direction.

The illustration of FIG. 9 indicates that in the forward and in the reverse directions, the motor 62, and thus the tape feed roller 61, accelerates to its operating speed without overshoot 64 or undershoot 65 and, after running at its operating speed, decelerates to an abrupt stop, without overrun 66 or reversal 67. The faults avoided are shown in broken lines and the desired operation is indicated by the solid lines 68, 69 and 71 representing acceleration, operating speed and deceleration, respectively. The operation of the motor is not effected by variation of the motor voltage, variation of current in the rotor winding due to an increase in temperature or to variation of brush and segment positions.

Slight variations in the time of changeover from the acceleration to the operating speed and slight variations in the time of changeover from the deceleration to rest occur due to the variation and clamping of the integrated current to the predetermined magnitudes of operating speed and zero speed, respectively. This does not affect the proper operation of the tape recorder, since the interval between a control command and data to be recorded is kept constant; the time between the starting of the operation of the tape and the recording of data being sufficient to absorb any delay due to changeover from acceleration to operating speed, and the time between the completion of recording of data and the stopping of the operation of the tape being sufficient to absorb any delay time due to changeover from deceleration to rest.

While the invention has been described by means of specific examples and in a specific embodiment, we do not wish to be limited thereto, for obvious modifications will occur to those skilled in the art without departing from the spirit and scope of the invention.

We claim:

1. An acceleration and deceleration control system for a DC motor having a rotor which is accelerated from rest to operating speed and which is decelerated from operating speed to rest during normal operation, said rotor having a rotor winding through which acceleration current flows during acceleration of said rotor and through which deceleration current flows during deceleration of said rotor, operating current flowing therethrough during operating speed thereof, said control system comprising rotor current supply means for supplying acceleration current, operating current and deceleration current to said rotor;

integrating means coupled to said rotor current supply means for integrating said acceleration current during acceleration of said rotor and for integrating said deceleration current during deceleration of said rotor;

clamping means connected between said integrating means and said rotor current supply means for clamping the integrated acceleration current when said integrated acceleration current reaches an operating magnitude corresponding to the operating speed of said rotor and for clamping the integrated deceleration current when said integrated deceleration current reaches a rest magnitude corresponding to zero operating speed;

differentiating means connected to said integrating means for differentiating the integrated acceleration and deceleration currents; and control means connected between said differentiating means and said rotor current supply means for stopping the supply of acceleration current and initiating the supply of operating current to said rotor at the time that said integrated acceleration current reaches said operating magnitude and for stopping the supply of deceleration current and stopping the supply of current to said rotor at the time that said integrated deceleration current reaches said rest magnitude.

2. An acceleration and deceleration control system for a DC motor as claimed in claim 1, wherein said rotor current supply means comprises a source of acceleration voltage, a source of operating voltage, a source of deceleration voltage and a plurality of electronic switching means interposed between said voltage sources and said rotor and controlled in operation by said control means.

3. An acceleration and deceleration control system for a DC motor as claimed in claim 2, wherein said electronic switching means comprise transistors having control electrodes connected to said control means.

4. An acceleration and deceleration control system for a DC motor as claimed in claim 1, wherein said integrating means comprises a resistor connected to said rotor current supply means and a capacitor connected in series with said resistor.

5. An acceleration and deceleration control system for a DC motor as claimed in claim 1, wherein said integrating means comprises a resistor connected to said rotor current supply means and a capacitor connected in series with said resistor and said differentiating means comprises a resistor connected in parallel with said capacitor between sad capacitor and said control means.

6. An acceleration and deceleration control system for a DC motor as claimed in claim 5, further comprising a transistor having a base electrode, an emitter electrode, an emitter-base path connected in series with the resistor of said differentiating means, and a collector electrode connected to said control means.

References Cited

UNITED STATES PATENTS

| 3,187,243 | 6/1965 | Long | 318—6 |
| 3,251,563 | 5/1966 | Kleist et al. | 318—257 |
| 3,293,522 | 12/1966 | Lewis | 318—257 |
| 3,318,546 | 5/1967 | Bejach | 318—7 |

ORIS L. RADER, *Primary Examiner.*

G. SIMMONS, *Assistant Examiner.*